United States Patent [19]

Gossett

[11] 3,863,223

[45] Jan. 28, 1975

[54] CONTROL SYSTEM FOR CODED DATA TRANSMISSION

[75] Inventor: Cyrille Gossett, Danjoutin, France

[73] Assignee: Societe Industrielle Honeywell Bull (Societe Anonyme), Paris, France

[22] Filed: Sept. 5, 1972

[21] Appl. No.: 286,532

[30] Foreign Application Priority Data

Sept. 22, 1971 France .............................. 71.34085

[52] U.S. Cl. ............................................ 340/172.5

[51] Int. Cl...... G06f 3/00, G08b 29/00, G08c 25/00

[58] Field of Search..................... 340/172.5, 149 A; 235/61.7 B

[56] References Cited

UNITED STATES PATENTS

| | | | |
|---|---|---|---|
| 3,465,289 | 9/1969 | Klein | 340/149 A |
| 3,576,544 | 4/1971 | Cordero et al. | 340/172.5 |
| 3,609,697 | 9/1971 | Blevins et al. | 340/172.5 |
| 3,618,028 | 11/1971 | Johnson et al. | 340/172.5 |
| 3,641,315 | 2/1972 | Nagata et al. | 235/61.7 B |
| 3,641,497 | 2/1972 | Constable | 340/149 A |

*Primary Examiner*—Gareth D. Shaw
*Assistant Examiner*—Jan E. Rhoads
*Attorney, Agent, or Firm*—Fred Jocob

[57] ABSTRACT

A control system is provided for coded data transmission affiliated with a device for entering data into the central processor, wherein the device includes a data generator, an authorization circuit and a buffer store. According to the invention the said system includes a first circuit for controlling authorization, a second circuit for communicating with the central processor, a third circuit for error detection and for acceptance by the central processor of the entered data and means for synchronization.

8 Claims, 12 Drawing Figures

CONTROL SYSTEM FOR CODED DATA TRANSMISSION

BACKGROUND OF THE INVENTION

The present invention relates to a control system for coded-data transmission, and is especially applicable to a device for entering data into a central processor of an information-processing system.

In a great number of problems handled by data processing systems, it is often convenient for the user to have the ability to intercede directly, either by supplying the central processor with various components of the operation under way, or by entering an exceptional feature.

A device for entering coded data into the central processor of a data-processing system is described in the French patent application No. 71 20883 filed on June 9, 1971 in the name of the applicant under the title: "Device For Entering of Data in a Data-Processing System." This device comprises a data generator (for example an electronic keyboard) which furnishes a single data at a time by supplying selectively and simultaneously logical q pulses on the q of the N inputs of a coding stage which has k outputs and sends these binary signals according to a coded combination characterizing said data. These signals are then transmitted to the central processor by the intermediary of an authorization circuit and a buffer store.

To accomplish the transmission of the data to the central processor, with the maximum security it is desirable to make use of media which has the capability, on the one hand, to notify the central processor as soon as a data is ready in the buffer store, and on the other hand, to know if the central processor is ready to accept this data. It is, furthermore, advisable to ascertain that no error has been committed in entering and transmitting of the data, either on the level of their development by the data generator, or on the level of their transmission by the authorization circuit and the buffer store, or finally, on the level of their acceptance by the central processor.

It is the object of the present invention to enhance the security of the data transmission in a device for entering coded data such as the one described in the above-mentioned patent application. It is especially applicable to a device for entering coded data into the central processor of a data processing system.

SUMMARY OF THE INVENTION

According to the invention the control system for data transmission is affiliated with a device for entering data into a central processor of data processing. This device includes:

a data generator furnishing on its k outputs binary signals according to coded combinations, an authorization circuit and a buffer store, functioning as a conveyance for the binary signals to the central processor.

It is characterized in that said control system comprises a first authorization-control circuit, a second circuit of communication with the central processor, a third circuit for error detection and for alerting the central processor of the entered data, and means for synchronization. The first circuit receiving k signals on the k inputs, exchanges two different signals with the third circuit and furnishes a control signal to the authorization circuit, the second circuit receiving a signal emitted by the first circuit on an input, enters a signal into the central processor, and the third circuit receives a signal from the central processor.

According to one version of embodiment of the invention the aforementioned means of synchronization consist of a clock-pulse generator linked with a first circuit and a second zero-setting circuit, both of which receive a signal originating from the first circuit and a signal stemming from the third circuit, the first circuit receiving the output signal from the zero-setting circuit, and the second circuit and the buffer store receiving the output signal from the second zero-setting circuit.

The pulse generator comprises a quartz clock, a pulse-period multiplier and pulse counter. The first circuit, the two zero-setting circuits, and the period multiplier receive the signal from the output of the quartz clock, the pulse counter receives the signal from the output of the first zero-setting output circuit.

The communication circuit receives a signal from the second zero-setting circuit and several signals emitted by the aforementioned counter. These signals provide for the repeated entry of the same data when the duration of its generation exceeds a set period.

The circuit for error detection and for alerting the central processor of the entered data which includes an inverter, two AND circuits, two OR circuits, and an error storage, is equipped with alarm media.

BRIEF DESCRIPTION OF THE DRAWING

The invention will be better understood from the following description, given with reference to the attached drawing, and presenting for purposes of non-limiting explanation a mode of embodiment in accordance with the invention.

In the drawing.

DESCRIPTION OF THE PREFERRED EMBODIMENT

Figure 1:
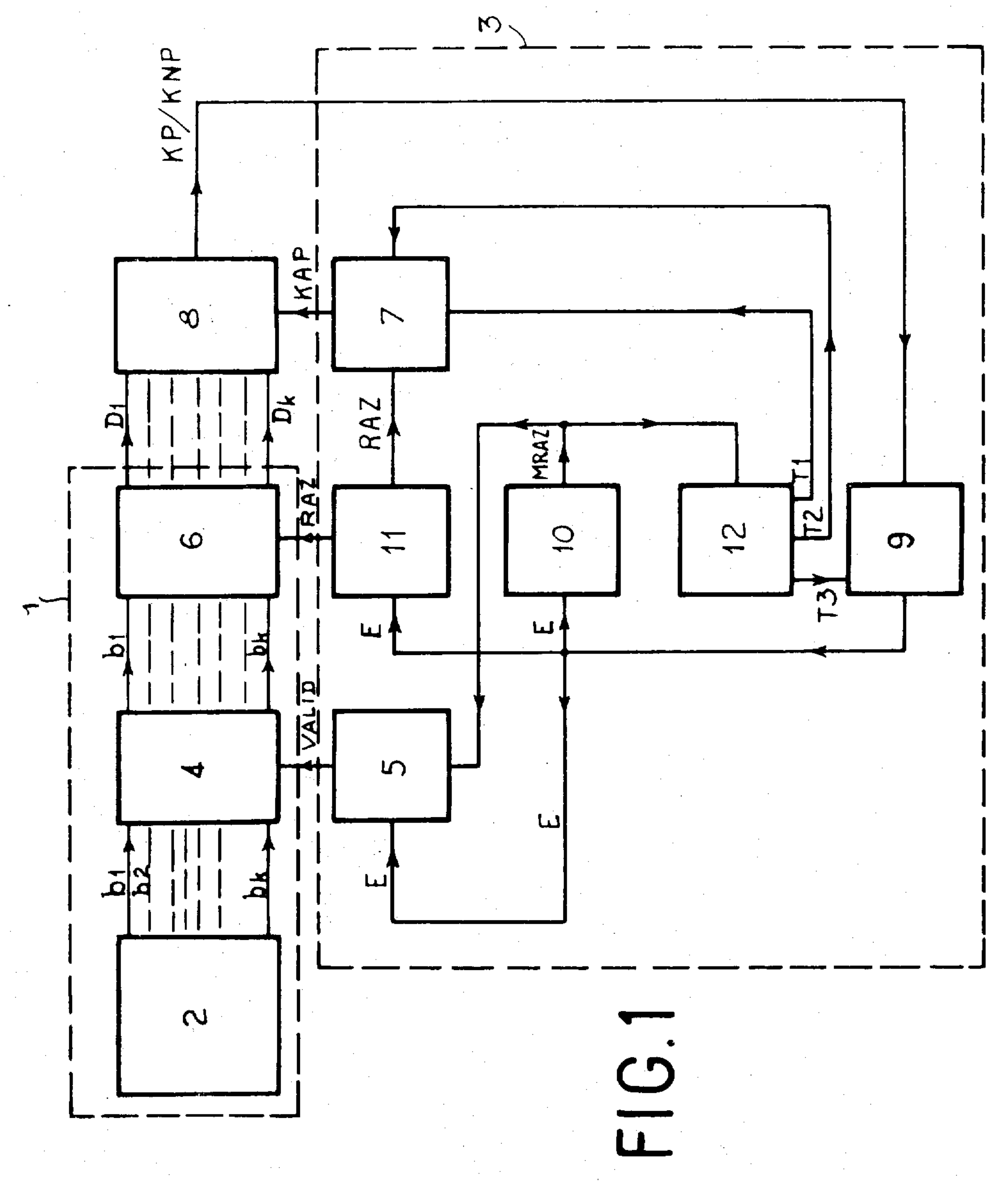
FIG. 1 is a block diagram showing the device for entering coded data, the central processor of the data processing system, and the control circuit according to the invention.

In the example of embodiment shown in FIG. 1 the device 1 for entering coded data supplies coded data in the form of k signals D1, D2 . . . Dk to a central processor 8, each group of k signals corresponding with one data. The development of the data by the device 1 and :heir entry into the central processor 8 are controlled by the data transmission control system 3.

FIG. 1 also includes the various component elements of the data entering device 1 and those of the control system 3, which are for the device 1, the data generator 2,
the authorization circuit 4 and
the buffer store 6,
and for the control system 3,
the authorization control circuit 5,
the communication circuit 7,
the circuit 9 for error detection and for alerting the central
processor 8 of the data entered through the device 1,
the first zero-setting circuit 10,
the second zero-setting circuit 11 and
the time base 12.

The data generator 2 supplies binary signals on its *k* outputs corresponding with coded combinations. These binary signals are logical pulses *b*1 . . .*bk* which are sent by the intermediary of the authorization circuit 4 to the buffer store 6 that converts them into the logical levels D1, D2 . . . D*k* before sending them on to the central processor 8. This data generator 2 may be an analog-digital converter which receives data in analog form through measurement pick-ups, such as pressure pick-ups, temperature pick-ups, speed pick-ups, etc., transforming these into binary signals in the coding stage. It may also be a keyboard, such as one described in the French patent application No. 71 23931 filed on June 30, 1971, in the name of the applicant for an "electronic keyboard," this keyboard being connected with the coding stage.

In the example to be described the code of the generator 3 output is one of two codes of 7 loads which are most frequently used in practice, i.e., the codes E B C D I C and U S A S C I I. In these conditions $k = 7$. It is evident, however, that the invention is by no means limited to a special code.

The transmission of the data (pulses *b*1, *b*2. . . *b*7) of the generator 2 to the buffer store 6 is controlled by the authorization circuit 4, which itself is dependent on the authorization-control circuit 5, the latter being set at zero by the first zero-setting circuit 10 before validation of each new data. Once a data is validated by the authorization circuit 4 it is not accepted by the buffer store 6 unless it is previously set at zero by the second zero-setting circuit 11. As soon as the buffer store 6 accepts a data a conversation begins between the control system 3 and the central processor 8 through the intermediary of the communication circuit 7 and the error-detection circuit 9. The communication circuit 7 sends a conversation signal to the central processor which, in response to this signal, sends a signal to the error-detection circuit 9 announcing whether it accepts the binary signals contained in the buffer store 6.

The buffer store 6 and the communication circuit 7 are simultaneously set at zero by the circuit 11.

If the processing which is under way does not permit the central processor 8 to become aware of the entered data, which will be the same in the case where an error has been committed by the data entry device 1, the error-detection circuit 9 interrupts the operation of the authorization-control circuit 5, of the buffer store 6, and of the communication circuit 7.

In a preferred version of embodiment of the invention the communication circuit 7 allows for the repeated entry of the same data when its generation period exceeds a set duration. This is the case in signals generated by a keyboard for any extended depression of a key.

Figure 2:
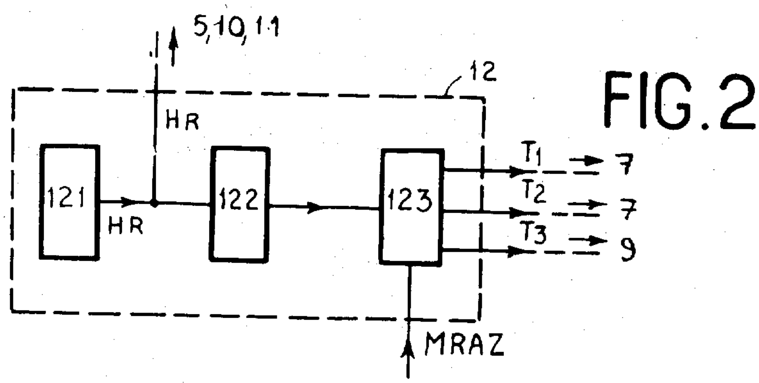
FIG. 2 is a schematic embodiment of the time base.
Figure 7:
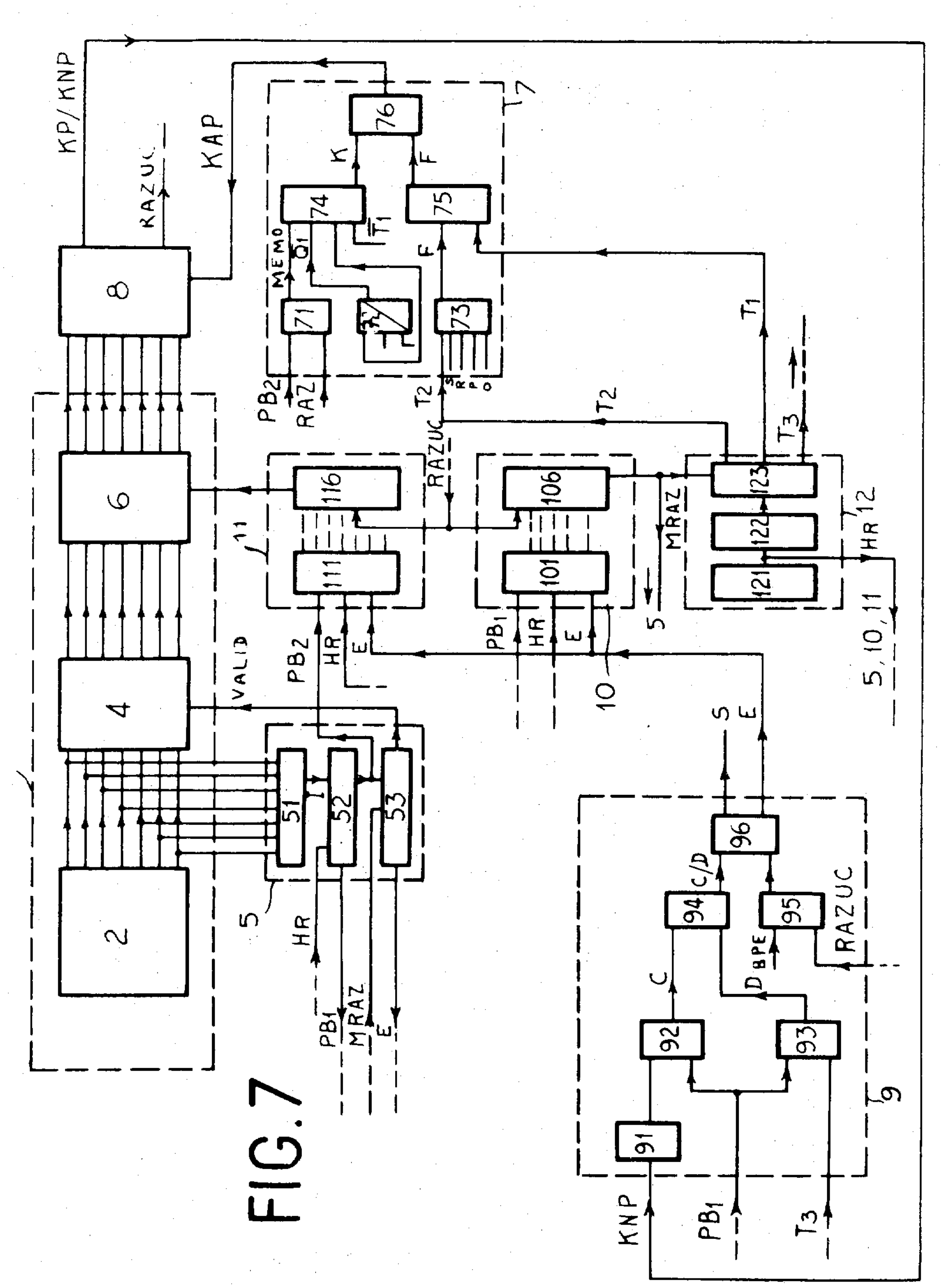
FIG. 7 is a more detailed view of FIG. 1.

The time base 12 supplies the communication circuit 7, the error-detection circuit 9 and the authorization control circuit 5 with signals whose duration determines that of the output signals of all of these circuits. Such time base 12 fills an essential function in the synchronization of all the other circuits. The different components of which it consists are indicated in FIGS. 2 and 7. They are: the clock 121, the period multiplier 122, and the counter 123.

The clcok 121 is made of quartz and is triggered roughly at the moment $t_0$ in which the data generator 2 is set in motion, this moment being, in the case of a keyboard, that of the depression of any one key.

The clock 121 furnishes a rectangular pulse train HR of the period $T_{HR}$, shown in FIG. 8*a*.

Figure 8:
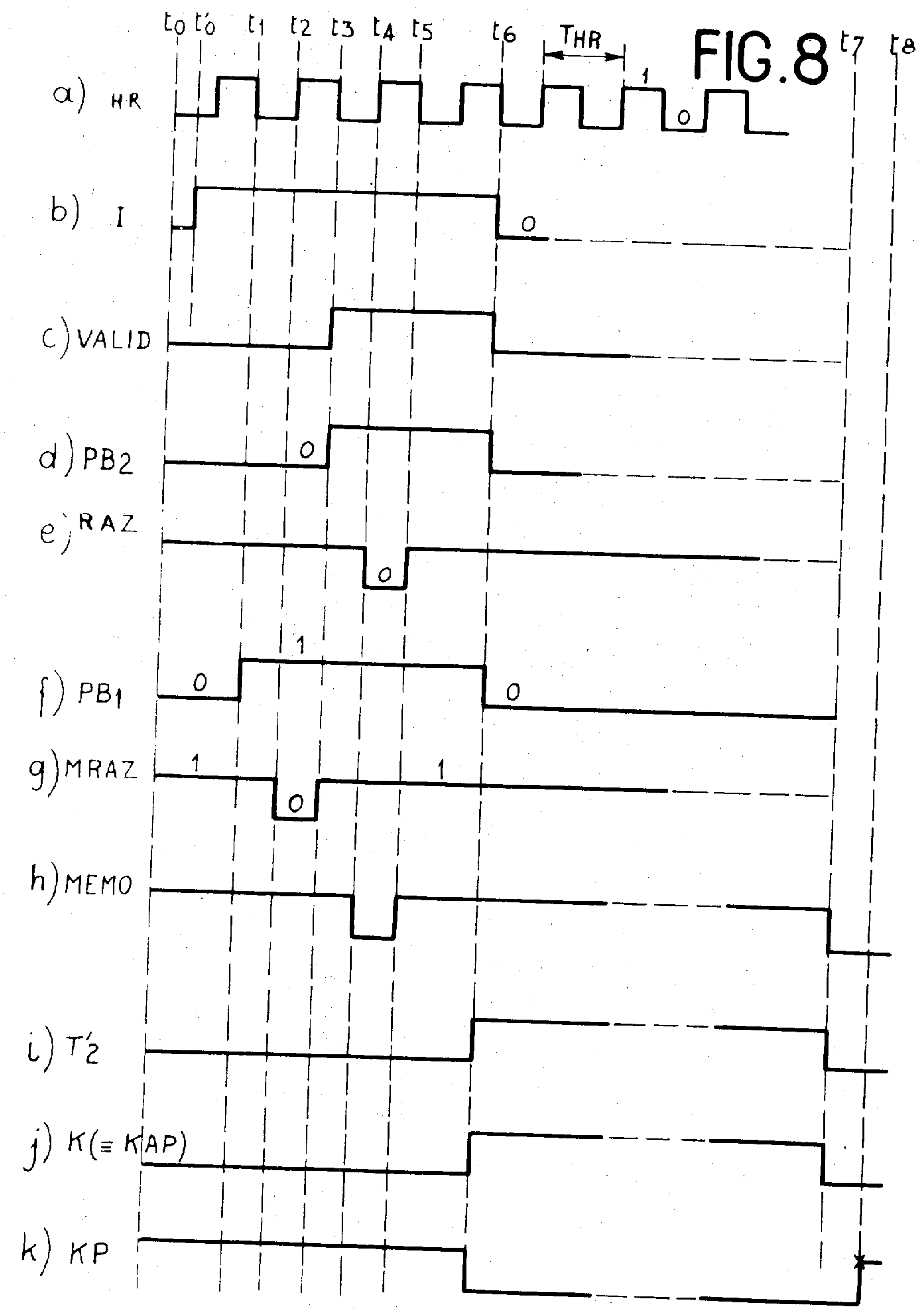
FIG. 8 is a chronogram of signals illustrating the general operation of the control circuit according to the invention.
Figure 11:
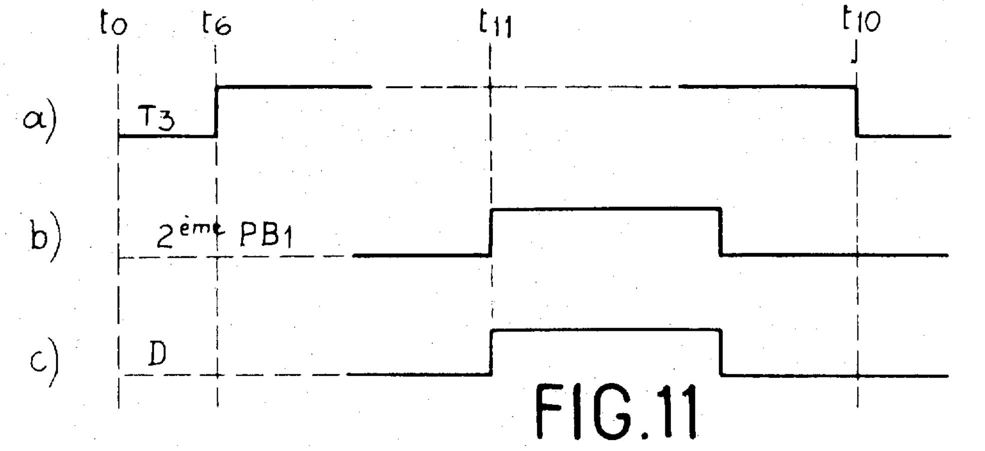

In the same FIG. 8, all signals have the same period origin $t_0$ which corresponds with that of data generation. It is evident that these signals reproduce themselves the same each time a new data is sent out by the data generator 2.

The signal HR is sent to the authorization control circuit 5, to the zero-setting circuits 10 and 11, and to the multiplier input 122, whose output signal (not shown) is a rectangular signal the period of which is a multiple of the period $T_{HR}$ of the signal HR. This output signal of the period $T_H = 2^6T_{HR}$ is sent in turn to the counter 123 input which furnishes at its three outputs three signals T1, T2, and T3, T1 and T3 being transmitted to the communication circuit 7 and T3 to the error-detection circuit 9 (FIGS. 1, 2, and 7). This counter 124 is set at zero by the signal MRAZ, shown in FIG. 8*g*, and emitted by a zero-setting circuit 10. This zero-setting occurs between the instants *t*2 and *t*3 in which this signal is equal to zero logic.

Figure 3:
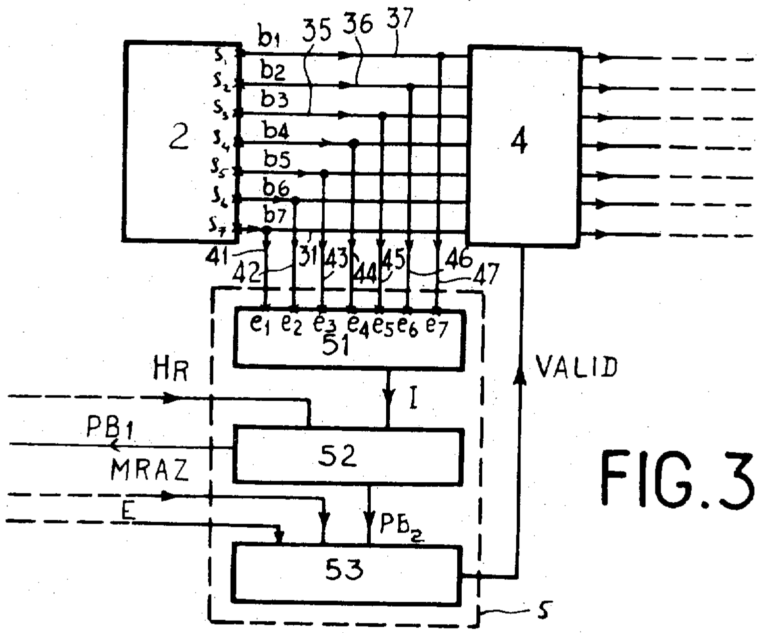
FIG. 3 is a schematic embodiment of the authorization control circuit.

The authorization-control circuit shown in FIGS. 3 and 7 comprises in series the OR circuit 51, the storage 52, and the AND circuit 53.

The OR circuit 51 has 7 inputs *e*1, *e*2. . . *e*7 connected with 7 lines 41 to 47 which in turn are connected in parallel to the lines 31 to 37, the latter being tied to 7 outputs S1 to S7 of the generator 2. The connections between the lines 31 to 37 and 41 to 47 which are represented by cross points clearly shown in FIG. 3 are mounted between the generator 2 and the authorization circuit 4.

Figure 4:
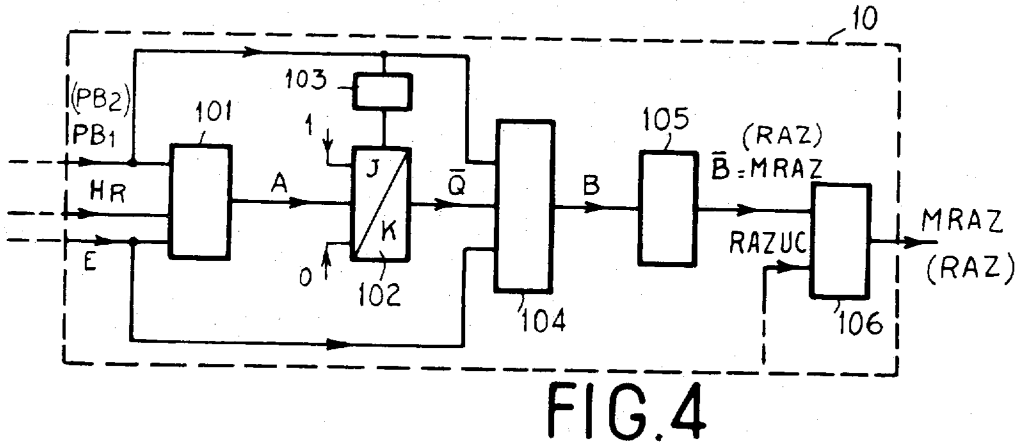
FIG. 4 is a schematic representation of the zero-setting circuit.
Figure 9:
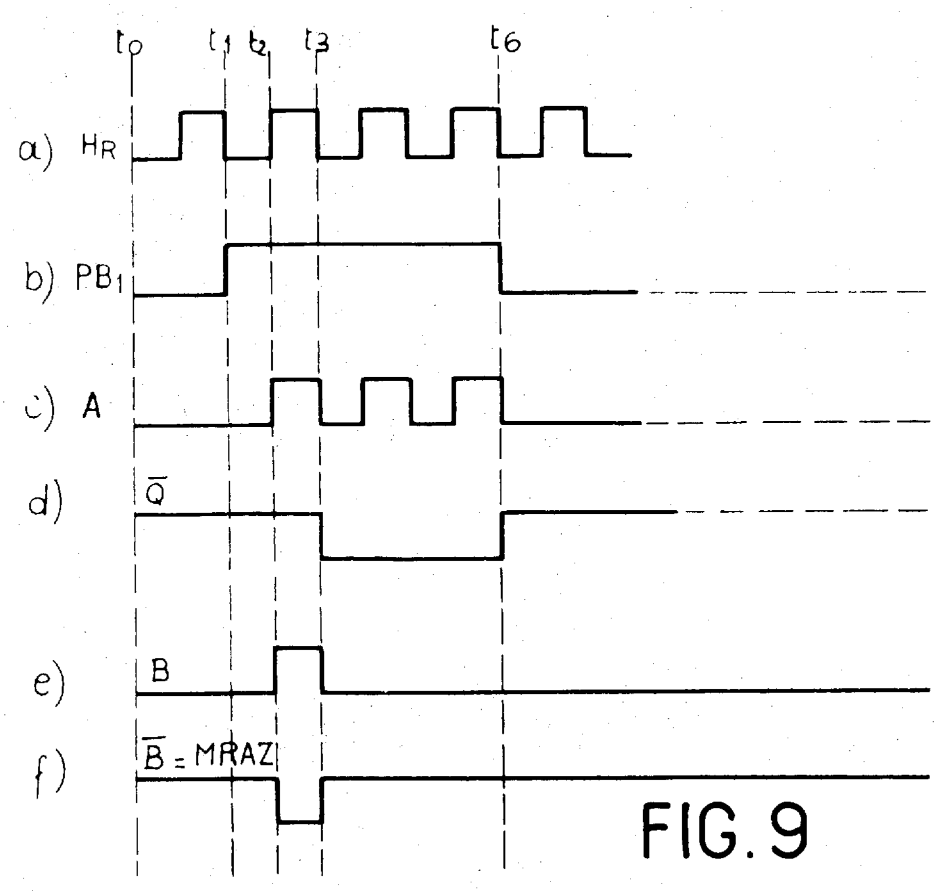
FIG. 9 is a signal chronogram illustrating in particular the functioning of the zero-setting circuits.

Thus, when the data generator 2 is in operation the seven pulses *b*1 to *b*7 appear on the seven inputs of the OR circuit 51. Since according to the chosen code at least one of the pulses is equal to logic 1 it follows that the output 1 signal of the OR circuit 51 is a pulse equal to logic 1. This pulse is illustrated in FIG. 8b and is equal to logic 1 between the moments *t*'0 (*t*'0 being somewhat different from *t*0) and *t*6. It is sent to the input J of the storage 52 of the type JK, the input *k* being at 0 logic. The signal HR is sent to the clock input of the storage JK 52. At the end of a period $t_1 = t_0 + T_{HR}$ the storage 52 emits a signal PB1 which is transmitted to the circuits 9 and 10 (see FIG. 8*f*). At the end of a period $t_3 = {}_{t0} + 2T_{HR}$ the storage 52 furnishes a signal PB2 equal to logic 1 between the instants $t_3$ and $t_6$ (see FIG.,8*d*) which is sent to the input of the AND circuit 53. The signals PB1 and PB2 denote that the pulses *b*1. . . *b*7 have appeared on the generator 2 outputs. On the two other inputs of the AND circuit 53 the zero-setting signal MRAZ transmitted by the first zero-setting circuit 10, shown in FIG. 8*g*, and the signal E, equal to logic 1, sent by the error-detection circuit 9 when no error was detected, appear. On the output of AND circuit 53 the VALID signal shown in FIG. 8*c*, is obtained. It is equal to logic 1 when the signals $PB_2$, MRAZ and E are themselves simultaneously equal to logic 1. The VALID signal is sent to an input of the authorization circuit 4 whose other inputs are driven by the pulses *b*. . .*b7*. Since the circuit 4 is an AND circuit the pulses *b*1. . .*b*7 are only transmitted to the buffer store 6 when the VALID signal is equal to logic 1, that is, when the three conditions as evidenced by the presence of the signal E, $PB_1$, and MRAZ at the input of the AND circuit 53 have materialized simultaneously. The two zero-setting circuits 10 and 11 being identical, only the zero-setting circuit 10 will be described. This circuit, illustrated in FIGS. 4 and 7, consists of an AND circuit 101, the flip-flop 102, the inverter 103, an AND circuit 104, the inverter 105, and an OR circuit 106 (for reasons of drawing convenience only the AND circuit 101 and OR circuit 106 are shown in FIG. 7). The operation of this circuit may be followed from FIG. 9 which is a signal chronogram drawn at the output of the various aforementioned elements making up the circuit 10.

On the three inputs of the AND circuit 101 the signals E, HR, and PB1 are available. The latter signal, which is shown in FIG. 9b, is produced by the storage 52. It is equal to the logic 1 between the instants $t_1$ and $t_6$, $t_1$ being equal to $t_0 + T_{HR}$. At the output of the AND circuit 101 a signal A is obtained, as illustrated in FIG. 9*c*, which is identical with HR between the moments $t_2$ and $t_6$. This signal A is sent to one of the two inputs of the flip-flop 102, the other input being driven by the signal $\overline{PB1}$, the reverse of PB1, furnished by the inverter 103. At the output of this flip-flop the signal $\overline{Q}$, represented in FIG. 9*d*, is obtained. It is equal to logic 1, except between the moments $t_3$ and $t_6$ where it is equal to zero logic. This signal $\overline{Q}$ as well as the signals PB1 and HR are transmitted to the three inputs of the AND circuit 104 which furnishes a signal B to the inverter 105. The signal B may be seen in FIG. 9e and is equal to logic 1 between the instants $t_2$ and $t_3$. The signal $\overline{B}$ is obviously the signal MRAZ, already shown in FIG. 8*g*. The signal MRAZ is transmitted to one of the two inputs of the OR circuit 106, while the central processor 8 sends a signal RAZUC to the other input during the start of the operation of the installation. This signal RAZUC which may be different from MRAZ (with respect to the duration during which it is equal to logic zero) does not become active during the operation of the system and for this reason is not included in the explanations given below. It is for this reason that one has to concede that the OR circuit 102 has an output signal MRAZ. The circuit 11 has the same structure as the circuit 10 and the same signals apply to its inputs, except for PB1 which is replaced by PB2. It must also be understood that the output signal of the second zero-setting circuit 10 is RAZ, this signal, illustrated in FIG. 8*e*, being equal to zero logic between the instants $t_4$ and $t_5$. The various signals designed to accomplish the synchronization of the circuits 5, 7, and 9, may obviously be obtained by other means without thereby departing from the framework of the invention.

Figure 5:
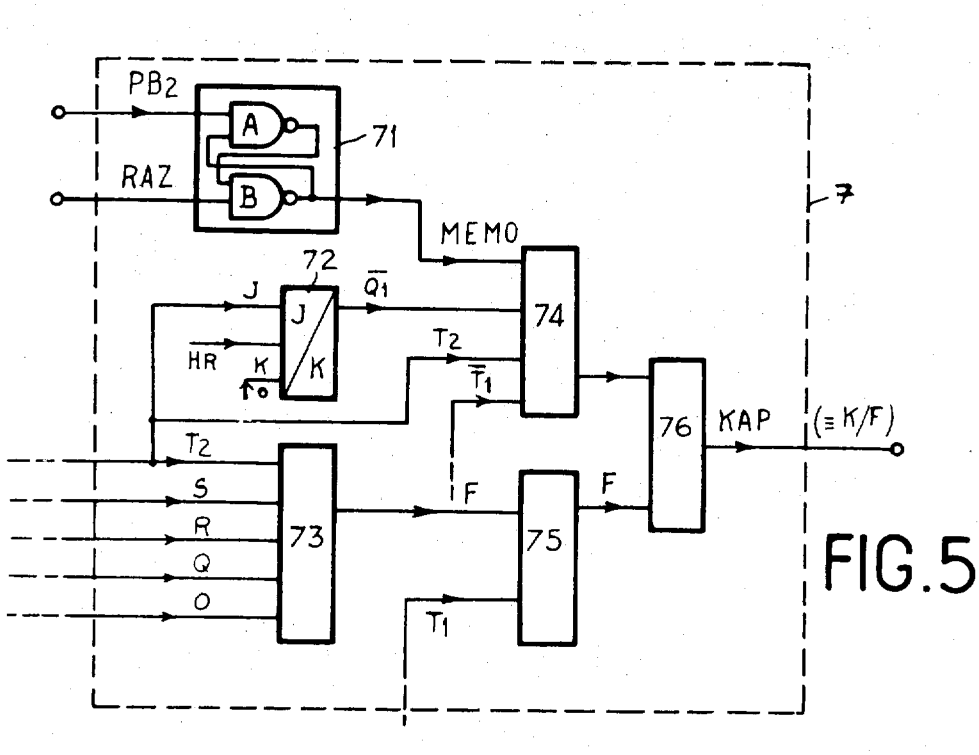
FIG. 5 is a schematic embodiment of the communication circuit.

As may be seen in FIGS. 5 and 7, the communication circuit 7 comprises a storage 71 which consists of two NAND circuits 71A and 71B, the memory JK 72, the AND circuits 73, 74, and 75, and the OR circuit 76.

Figure 12:
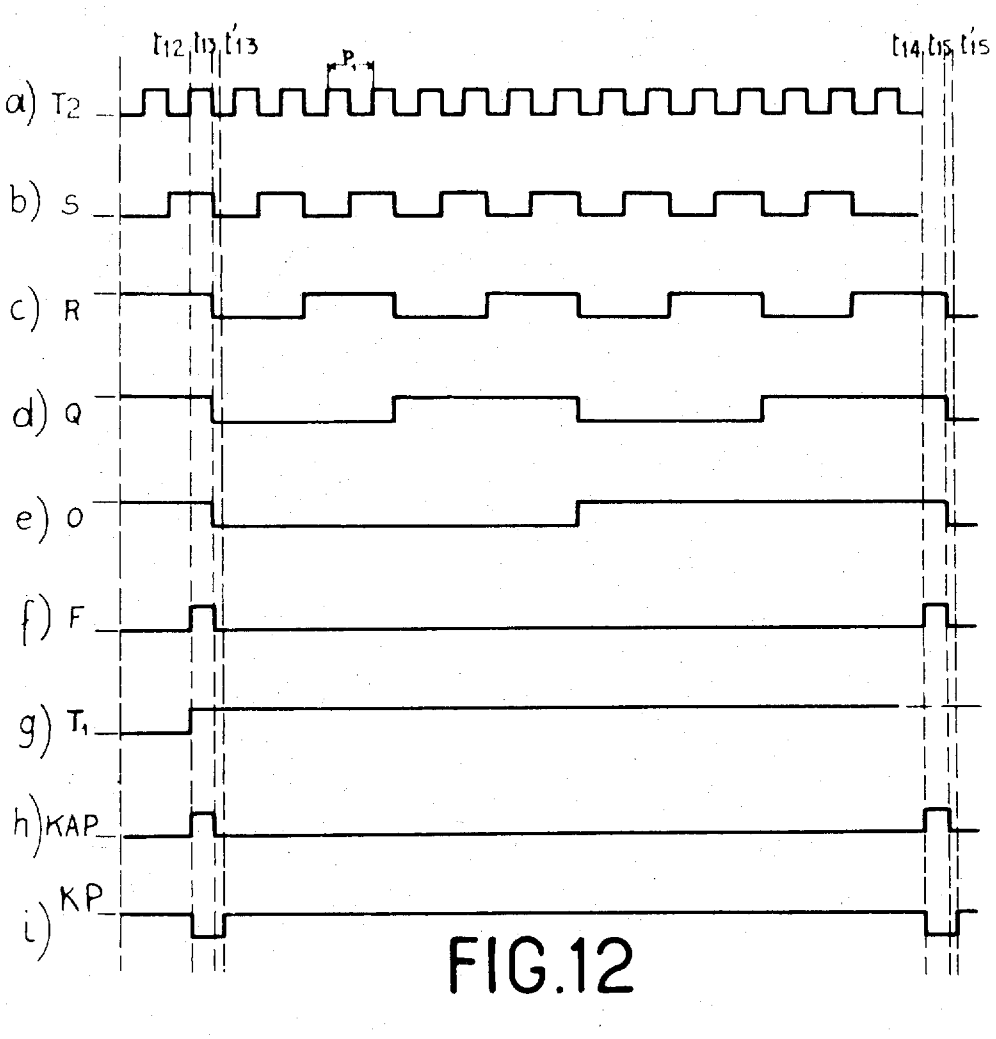
FIG. 12 is a signal chronogram showing in particular the operation of the communication circuit.

For a better understanding of the communication circuit 7 one must imagine the two following distinct cases by referring to the signal T1 furnished by the counter 123, as shown in FIG. 12*g*. The origin of the periods $t_0$, common to all signals, for reasons of drawing convenience has not been illustrated in the same figure with respect to the time scale, the latter being markedly larger than that in FIGS. 8, 9, 10, and 11 (1 cm representing approximately 6 ms). 1. From the moment $t_0$ the data generator 2 is actuated for a period below the time interval $(t_{12} - t_0)$, $t_{12}$ being the instant in which the signal T1 rises to the logic 1. This means for a keyboard that the depression time of the key is below $(t_{12} - t_0) - 0.4$ sec. This type of operation is the more common one. 2. The generator 2 is actuated from the moment $t_0$ on during a period above $(t_{12} - t_0)$, hence the central processor 8 takes into account the same data emitted by the device 1 at the rate of 10 times per sec. These two cases are examined in the below indicated order.

In the first instance (between the moments $t_0$ and $t_{12}$) the signals PB2 (input of NAND 71A) and RAZ (input of NAND 71B) are sent to the two inputs of the memory 71. At the output of NAND 71B a signal MEMO is obtained, to be noted in FIG. 8*h*, which is identical with RAZ, and sent to one of the 4 inputs of AND circuit 74. The following signals are transmitted to the other three inputs of this circuit 74:

the signal T2 whose general behavior is shown in FIG. 12*a*, a rectangular signal of period P1, alternatingly equal to zero and to logic 1 for a period equal to P1/2. In the herein described example P1/2 = 3ms = $2^8T_H$, the signal $\overline{T1}$, the reverse of T1, equal to logic 1 between the instants $t_0$ and $t_{12}$, the signal $\overline{Q}1$ emitted by the flip-flop JK 72. The signal T2 is sent to the input J of this flip-flop, while the input K is at zero logic and the clock input is fed by the signal HR. The signal $\overline{Q}1$ (not shown) is equal to zero logic as soon as the first pulse T'2 of the signal T2 (see FIG. 8i) is equal to zero logic, i.e., at the moment $t_7$ with $t_7 << t_{12}$.

At the output of the AND circuit 74 the signal K is obtained which is identical with a first gate T'2 of the signal T2 between the instants $t_6$ and $t_7$ and equal to zero logic outside this time interval. This signal, shown in FIG.,8*j*, is transmitted to one of the two inputs of the OR circuit 76, at the output of which the signal KAP, then identical with K, is obtained. This signal KAP is transmitted to the central processor 8 which, in response to this signal, generates a signal KP as shown in FIG. 8*k*, which it sends to the error-detection circuit 9. This signal, usually equal to logic 1, drops to zero at the moment $t_8$ in which KAP rises to logic 1. It remains equal to logic zero up to the instant $t_8$ ($t_8$ being next to, but different from $t_7$) in which interval the central processor accepts the signals D1 to D7 furnished by the device for data entry and contained in the buffer store 6. Such acceptance occurs only when the signals D1 to D7 corresponding with data previously furnished by the device 1 have been taken into account by this same unit 8. In the opposite case, the central processor 8 sends to the error-detection circuit 9 a signal KNP which remains equal to zero logic from the instant $t_6$, on as may be noted in FIG. 10*a*.

In the second case (instants after $t_{12}$) the signals T2, S, R, Q, and 0, furnished by the counter 123 of the respective periods $2^6T_H$, $2^7T_H$, $2^8T_H$, $2^9T_H$, and $2^{10}T_H$ and illustrated in FIGS. 12*a* to 12*e*, respectively, are sent to the five inputs of the AND circuit 73 at whose output the signal F is obtained, as seen in FIG. 12*f*, equal to logic 1 between the moments $t_{12}$ and $t_{13}$ (for $t_{13} - t_{12} = P\ ½ = 3$ ms), to zero logic between the instants $t_{13}$ and $t_{14}$ (for $t_{14} - t_{13} = 100$ ms), again equal to logic 1 between the moments $t_{14}$ and $t_{15}$ (for $t_{15} - t_{14} = t_{13} - t_{12} = P1$) etc., as long as the data generator 2 is actuated (which is as long as the depression of the key lasts in the case of a keyboard).

The signal F is transmitted to one of the two inputs of the AND circuit 75 and the signal T1 is sent to the other input the signal F being transmitted by the AND circuit 75 to the input of the OR circuit 76. At the output of the latter the signal KAP is obtained, then identical with F, appearing in FIG. 12*h*.

In response to this signal KAP = F the central processor 8 transmits the signal KP to this error-detection circuit 9, which signal is illustrated in FIG. 12*i*. This signal is equal to logic 1, except between the instants $t_{12}$ and $t'_{13}$, $t_{14}$ and $t'_{15}$ during which it declines to zero logic. $t'_{13}$ and $t'_{15}$ are closely related, but different from $t_{14}$ and $t_{15}$. $T'_{13}$ and $t'_{15}$ are the instants in which the central processor 8 accepts the signals D1 to D7 supplied by the device 1. Obviously, in the contrary case (non-acceptance of the signals) the procedure is the same as in the first case.

It should be noted that in the first case only the signal K appears in the input of the OR circuit 76 since the signal F cannot be transmitted by the AND circuit 75 and T1 is then equal to zero logic.

On the other hand, it must be realized that in the second case only the signal F is present in the inputs of the OR circuit 76 since the signal K is then equal to zero logic ($\overline{Q}1$ and $\overline{T}1$ being then equal to zero logic).

Figure 6:
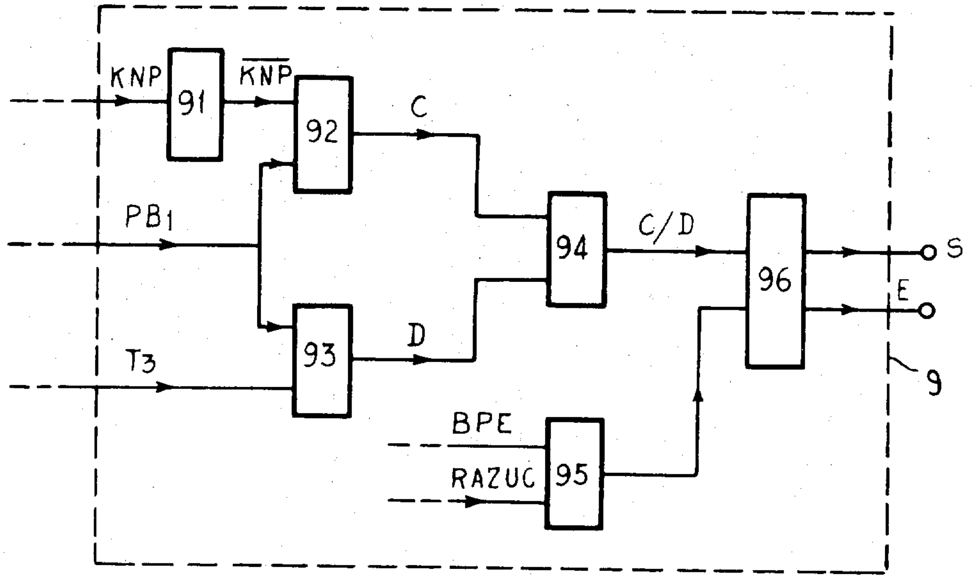
FIG. 6 is a schematic embodiment of the error-detection circuit.

The error-detection circuit 9, illustrated in FIG. 6, includes the inverter circuit 91, the AND circuits 92 and 93, the OR circuits 94 and 95, and the error storage 96.

Two important cases of error may occur:

1. The central processor 8 has not taken into account a first data, a second data is sent by the generator 2.

2. During the period in which the signal T3 is equal to logic 1 a second data is generated.

Figure 10:
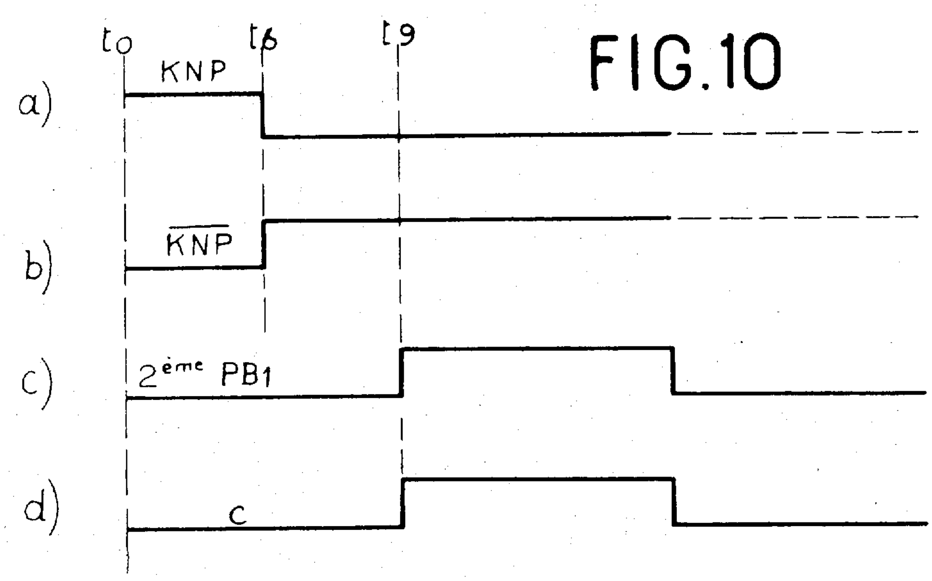
FIGS. 10 and 11 are signal chronograms illustrating in particular the operation of the error-detection circuit.

In the first case the inverter 91 receives the signal KNP, shown in FIG. 10*a*. The signal $\overline{KNP}$, emitted by the inverter 91, is transmitted to one of two inputs of the AND circuit 92, while the second input receives the signal PB1 corresponding with the transmission of the second data supplied by the generator 2. This signal is illustrated in FIG. 10*c*. It is evident that in that figure, the time scale is different from that used in FIGS. 8 and 9. The same length in FIG. 10 represents a much longer period than that in FIGS. 8 and 9.

At the output of the AND circuit 92 the signal C is obtained, shown in FIG. 10*d* (identical with PB1) which is sent to one of two inputs of the OR circuit 94. This signal C is found again at the input of the error storage 96. At the moment $t_9$ in which the signal C is equal to logic 1 the memory 96 is connected and furnishes two signals, on the one hand, an acoustical signal S, and on the other hand, the signal E, then equal to zero logic.

In the second case, when a first data is supplied by the generator 2, a first signal PB1 is emitted, which is, as shown above, equal to logic 1 between the instants $t_1$ and $t_6$ (FIG. 8*g*). At the moment $t_6$ in which PB1 declines to zero logic the signal T3 is equal to logic 1 up to the moment $t_{10}$, as is apparent from FIG. 11*a*. This signal T3 is sent to one of the two inputs of the AND circuit 93. When during the time interval $t_6 - t_{10}$, a second data is generated by the generator 2 a second signal PB1, illustrated in FIG. 11*b*, is transmitted to the second input of the AND circuit 93 at whose output the signal D (identical with PB1) is obtained, as shown in FIG. 11*c*. The latter is transmitted by the OR circuit 94 to the storage 96 which is connected at the instant $t_{11}$, and then emits the signals S and E as in the first case.

In each of the two cases the connection of the storage 96 is arrested, either by depression of an erasing push button which generates a logical level BPE equal to zero and which is sent to the OR circuit 95 which transmits it to the storage 96, or by the signal RAZUC also transmitted to the OR circuit 96 (only during the maintenance of voltage of the information processing system).

Clearly, the transmission control system for coded data may be applied in every instance in which one intends to enter binary data into the central processor of a data processing system by the intermediary of an authorization circuit and a buffer store, which is generally the case.

What is claimed is:

1. A control system for selectively entering data in a central processor, comprising in combination:

a data generator having k outputs at which a binary word appears corresponding to data generated;

a central processor for receiving said binary word;

an authorization circuit and a buffer store connected in series between said data generator and said central processor to transfer said binary word to the central processor; and a control circuit assembly for controlling transfer of said binary word to said central processor, said assembly comprising an authorization control circuit, clock means, a first setting circuit, a second setting circuit, an error detecting circuit, and a communication circuit; said clock means being responsive to operation of said data generator for producing a train of clock pulses and including a resettable counter providing a plurality of count outputs; said authorization control circuit including means responsive to a binary word output at said *k* outputs of the data generator, a first setting signal and a signal indicating lack of error for producing sequentially occurring first and second reset signals and a validating signal occurring after said first reset signal, said validating signal being connected to said authorization circuit to cause said binary word to be passed to said buffer store; said first setting circuit including means responsive to said first reset signal, said clock pulses and said signal indicating lack of error for producing said first setting signal; said second setting circuit including means responsive to said second reset signal, said clock pulses and said signal indicating lack of error for producing a second setting signal subsequent to said validating signal; said buffer store responsive to said second setting signal to pass said binary word to said control processor; said communication circuit including means responsive to said second reset signal, said second setting signal and certain of said count outputs for producing a transfer signal subsequent to said record setting signal; said central processor being responsive to said transfer signal to produce an acceptance signal if said binary word is acceptable thereby; and said error detection circuit including means responsive to non-overlap of said acceptance signal and said first reset signal for maintaining said signal indicating lack of error; said counter of the clock means being reset by said first setting signal.

2. A control system as defined in claim 1 wherein said authorization control circuit comprises first means responsive to said binary word output for producing a control signal, second means responsive to said control signal for producing said first reset signal and to said control signal plus said clock pulses for producing said second reset signal, and third means responsive to said second reset signal, said first setting signal and said signal indicating lack of error for producing said validating signal.

3. A control system as defined in claim 1 wherein said communication circuit also includes means responsive to some of said count output and to repetition of said second reset and second setting signals for producing a second transfer signal whereby said binary word is accepted twice by said central processor.

4. A control system as defined in claim 1 wherein said error detection circuit also includes means responsive to one of said clock outputs and a repetition of said first reset signal which overlaps said transfer signal for removing said signal indicating lack of error.

5. A control system as defined in claim 2 wherein said communication circuit also includes means responsive to some of said count output and to repetition of said second reset and second setting signals for producing a second transfer signal whereby said binary word is accepted twice by said central processor.

6. A control system as defined in claim 2 wherein said error detection circuit also includes means responsive to one of said clock outputs and a repetition of said first reset signal which overlaps said transfer signal for removing said signal indicating lack of error.

7. A control system as defined in claim 3 wherein said error detection circuit also includes means responsive to one of said clock outputs and a repetition of said first reset signal which overlaps said transfer signal for removing said signal indicating lack of error.

8. A control system as defined in claim 5 wherein said error detection circuit also includes means responsive to one of said clock outputs and a repetition of said first reset signal which overlaps said transfer signal for removing said signal indicating lack of error.

* * * * *